(12) United States Patent
Orth et al.

(10) Patent No.: US 11,754,097 B2
(45) Date of Patent: Sep. 12, 2023

(54) ELECTROHYDRAULIC SYSTEM FOR A VALVE

(71) Applicant: Robert Bosch GmbH, Stuttgart (DE)

(72) Inventors: Alexandre Orth, Hettstadt (DE); Gottfried Hendrix, Gemuenden (DE); Tor Jensen, Ski (NO)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/755,392

(22) PCT Filed: Oct. 20, 2020

(86) PCT No.: PCT/EP2020/079439
§ 371 (c)(1),
(2) Date: Apr. 28, 2022

(87) PCT Pub. No.: WO2021/083724
PCT Pub. Date: May 6, 2021

(65) Prior Publication Data
US 2022/0403860 A1   Dec. 22, 2022

(30) Foreign Application Priority Data

Oct. 31, 2019 (DE) ..................... 10 2019 216 878.7

(51) Int. Cl.
*F15B 15/06* (2006.01)
*F15B 20/00* (2006.01)
*F16K 31/163* (2006.01)

(52) U.S. Cl.
CPC .......... *F15B 15/065* (2013.01); *F15B 20/002* (2013.01); *F15B 2211/30505* (2013.01);
(Continued)

(58) Field of Classification Search
CPC . F15B 15/065; F15B 20/00; F15B 2211/8752
See application file for complete search history.

(56) References Cited

U.S. PATENT DOCUMENTS 3,282,287 A * 11/1966 Fowler ................ F16K 31/1635
137/246.22
4,087,074 A *  5/1978 Massey ................ F15B 15/065
92/69 R
(Continued)

FOREIGN PATENT DOCUMENTS

KR        102201181 B1 *  1/2021   ............ F15B 15/065

OTHER PUBLICATIONS

International Search Report corresponding to International Patent Application No. PCT/EP2020/079439, dated Feb. 8, 2021 (5 pages).

*Primary Examiner* — Michael Leslie
(74) *Attorney, Agent, or Firm* — Maginot, Moore & Beck LLP

(57) ABSTRACT

An electrohydraulic system includes an output shaft, a hydraulic piston, and a preload device. The output shaft rotationally drives the valve and extends along a first axis. The hydraulic piston extends along a second axis perpendicular to the first axis, is actuated by a pressure medium, and rotates the output shaft. The preload device stores energy via preloading of an elastic element, which extends along a third axis, by a hydraulic cylinder and to transmit the energy to the output shaft in the event of a fault. The hydraulic piston is guided into first and second cylinder housings, and at least one of the cylinder housings is connected to the hydraulic cylinder. A check valve is arranged between the cylinder housing and the hydraulic cylinder, and is configured to decouple the preload device from the hydraulic piston, the blocking direction going from the hydraulic cylinder to the cylinder housing.

14 Claims, 5 Drawing Sheets

(52) U.S. Cl.
CPC ............. *F15B 2211/8623* (2013.01); *F15B 2211/8752* (2013.01); *F15B 2211/8755* (2013.01); *F16K 31/1635* (2013.01)

(56) References Cited

U.S. PATENT DOCUMENTS

| | | | |
|---|---|---|---|
| 4,132,071 A * | 1/1979 | Priese | F16K 31/02 60/903 |
| 4,520,994 A | 6/1985 | DeWald | |
| 6,708,489 B2 * | 3/2004 | Massey | F15B 15/065 91/417 R |
| 10,655,651 B2 * | 5/2020 | Modinger | F16K 31/1635 |
| 2003/0024239 A1 | 2/2003 | Massey et al. | |
| 2010/0187454 A1 | 7/2010 | Arnold et al. | |
| 2011/0155937 A1 | 6/2011 | Arnold | |
| 2019/0321942 A1 * | 10/2019 | Mallaley | F15B 15/065 |

\* cited by examiner

ELECTROHYDRAULIC SYSTEM FOR A VALVE

This application is a 35 U.S.C. § 371 National Stage Application of PCT/EP2020/079439, filed on Oct. 20, 2020, which claims the benefit of priority to Serial No. DE 10 2019 216 878.7, filed on Oct. 31, 2019 in Germany, the disclosures of which are incorporated herein by reference in their entirety.

The present disclosure relates to the field of electrohydraulic systems for a valve which are configured to drive a valve in rotation and which are configured, in the event of a fault, to rotate a valve into a predetermined rotated position and to secure this position. In particular, the present disclosure relates to an electrohydraulic arrangement which comprises the electrohydraulic system and a housing in which the electrohydraulic system is mounted.

BACKGROUND

A number of variants are known today which make it possible to rotate a rotational valve in the event of a fault into a predetermined rotated position and to secure this position. In particular, such variants make it possible, in the event of a fault, to control the valve in order to set a position in which the valve is closed and at the same time to secure this position so that it can be ensured that the valve remains closed.

In the case of such systems, the actuators are normally coupled such that, when the valve is adjusted, the restoring mechanism is simultaneously likewise moved. This has the consequence that, in order to adjust the valve, the restoring force always needs to be applied as well, which means a significantly higher energy input than is required to activate just the valve. Furthermore, in the case of conventional systems, it is not possible to effect the movement of the valve independently of the restoring mechanism such that the activating power can be applied at different times and the pretensioning device does not need to be activated each time the valve is activated because it is already pretensioned.

The object of the present disclosure is therefore to provide an electrohydraulic system for a valve which is compact and energy-efficient and can carry out the activation of the valve and pretensioning of the safety device in separate steps.

For this reason, this disclosure proposes a system and a method for implementing a compact rotary drive which is capable of providing a fail-safe emergency closure in the case of failure of the electricity supply.

SUMMARY

The present disclosure is based on the idea of producing a hydraulic system in which the pretensioning mechanism can be decoupled from the hydraulic piston which is responsible for rotating the output shaft so that the piston can rotate the shaft independently of the pretensioning and the spring can be pretensioned independently of whether the valve is open or closed.

According to an embodiment of the present disclosure, an electrohydraulic system for a valve, which is configured to drive a valve in rotation, is provided; wherein the system comprises an output shaft which can be connected directly to the valve in order to drive the valve rotatably and which extends along a first axis; wherein the system comprises a hydraulic piston which is configured to be activated by a pressure medium and which is arranged so as to rotate the output shaft, wherein the hydraulic piston extends along a second axis which is perpendicular to the first axis; wherein the system comprises a pretensioning mechanism which is configured to store energy generated by pretensioning an elastic element and to transmit said energy to the output shaft in the event of a fault such that the output shaft can be rotated into a predetermined position and this position can be secured, wherein the pretensioning mechanism is pretensioned by at least one hydraulic cylinder, and wherein the elastic element extends along a third axis; wherein the hydraulic piston is guided in a first and a second cylinder housing, wherein at least one of the cylinder housings is connected to the hydraulic cylinder; and wherein a shut-off valve, which is configured to decouple the pretensioning mechanism from the hydraulic piston and wherein the shut-off direction is from the hydraulic cylinder to one of the cylinder housings, is arranged between one of the cylinder housings and the hydraulic cylinder. This solution is particularly advantageous because it is actually possible with this solution to provide an electrohydraulic system for a valve in which the pretensioning mechanism can be decoupled from the hydraulic piston so that the piston can rotate independently of the pretensioning of the shaft and the spring can be pretensioned independently of whether the valve is open or closed. This form of the two cylinder housings is particularly advantageous because it makes it possible to use a compact cylinder which is engagement with the input shaft.

According to a further embodiment of the present disclosure, a system is provided wherein the predetermined position of the output shaft is a position in which the hydraulic piston is situated at the limit stop of one of the cylinder housings. This solution is particularly advantageous because it enables a more stable positioning of the output shaft. The predetermined position can also alternatively or additionally be a position at which the piston of the hydraulic cylinder of the pretensioning mechanism is at the limit stop. Alternatively or additionally, the limit stops can be predetermined by a valve attached to the outside of the output shaft.

According to a further embodiment of the present disclosure, a system is provided, wherein both the first and the second cylinder housings are connected to the hydraulic cylinder by a shut-off valve, wherein the shut-off direction is from the hydraulic cylinder to the first or the second cylinder housing. This solution enables a hydraulic connection both between the first cylinder housing and the hydraulic cylinder and between the second cylinder housing and the hydraulic cylinder. By virtue of this solution, the pretensioning mechanism can be pretensioned both when the pressure medium is fed to the first cylinder housing and when the pressure medium is fed to the second cylinder housing. The pretensioning can therefore be effected by different operating modes and the pretensioning process of the pretensioning mechanism can thus be effectively simplified.

According to a further embodiment of the present disclosure, a system is provided, wherein the said shut-off valve is a non-return valve and wherein the system moreover has a pump which is connected to the valve seat side of the non-return valve. This solution makes it possible to decouple the pretensioning mechanism from the cylinder housing with a single element.

According to a further embodiment of the present disclosure, a system is provided, wherein the pretensioning mechanism comprises a connecting mechanism which is coupled to the output shaft, and wherein the connecting mechanism comprises the following: a first connecting element which is preferably in engagement with teeth of the output shaft and, when the output shaft rotates, moves along a fourth axis which is parallel to the third axis, wherein an end, remote from the output shaft, of the first connecting element has a limit stop; and a second connecting element which is fixedly connected to the elastic element, wherein the second connecting element is coupled in sliding fashion to the first connecting element, and is arranged so as to carry along the first connecting element on the limit stop when the elastic element is relaxed. This solution is particularly advantageous because it is actually possible with this solution to rotate the output shaft into a predetermined position and to secure this position in the event of a fault using a very simple, reliable, and compact system.

According to a further embodiment of the present disclosure, a system is provided, wherein the two cylinder housings are each arranged above and below the output shaft, and the hydraulic piston comprises a rod section between the two cylinder housings, wherein the rod section has teeth which are in engagement with teeth of the output shaft, wherein the piston is activated by a pressure medium which is fed to at least one of the cylinder housings. This form of the two cylinder housings is particularly advantageous because it makes it possible to use a compact cylinder which is engagement with the input shaft. In particular, the piston contains both the connecting function between the two cylinder housings and also the connecting function to the output shaft.

According to a further embodiment of the present disclosure, a system is provided, wherein the elastic element comprises at least one spring system with at least one spring, in particular an arrangement of multiple springs arranged in parallel, wherein the spring or the springs are arranged parallel to the third axis. This solution is particularly advantageous because it is actually possible with this solution to use a known and reliable element, such as a spring or an arrangement of multiple springs arranged in parallel, in a novel and compact system.

According to a further embodiment of the present disclosure, a system is provided, wherein the second and the third axis are next to each other in parallel and the first axis is perpendicular to the second and to the third axis. This solution is particularly advantageous because it is actually possible with this solution to provide an electrohydraulic system for a valve which is compact and therefore can be applied to any rotationally activated valve. The reason for this is that the axes arranged next to each other make it possible to decouple the operating positions of the activation of the output shaft and the pretensioning mechanism along the output shaft. Furthermore, because the axes are parallel, it is possible to implement a simple system in which the main activations are arranged next to each other and are parallel to each other.

According to a further embodiment of the present disclosure, a system is provided, wherein the second axis is offset relative to the third axis along the output shaft. This solution is particularly advantageous because it is actually possible with this solution to use the length of the output shaft profitably.

According to a further embodiment of the present disclosure, an electrohydraulic arrangement is provided which comprises an electrohydraulic system according to one of the above-described embodiments and a housing in which the system is mounted, wherein the housing has an elongated form which extends along the output shaft, wherein a cross-section, perpendicular to the output shaft of the housing and close to an end section of the housing which is arranged opposite the pretensioning mechanism, has two pairs of edges, wherein there are two edges, parallel to each other, for each pair of edges. With such an arrangement, it is effectively possible to provide a hydraulic system which can also be used underwater and can be coupled simply to an existing valve.

According to a further embodiment of the present disclosure, an electrohydraulic arrangement is provided, wherein the cross-section is polygonal, preferably square. With such a form of the cross-section, the arrangement is particularly compact and can have a standard size.

According to a further embodiment of the present disclosure, an electrohydraulic arrangement is provided, wherein an end section of the output shaft which is arranged opposite the pretensioning mechanism projects from the housing and wherein the said section can be reversibly connected to and disconnected from the valve. This solution allows a simple connection to an external valve.

According to a further embodiment of the present disclosure, a method is provided in order to secure a predetermined rotated position of a valve in the event of a fault, wherein the valve is configured so as to rotate about a first axis of rotation by virtue of the movement of an element along a second axis, wherein, in order to reach and secure the predetermined position of the valve in the event of a fault, an elastic element is used and the elastic element extends along a third axis so that a position of the valve is secured, and wherein the second and the third axis are next to each other in parallel and the first axis is perpendicular to the second and to the third axis. Such a method is completely consistent with one of the systems which were described in the other embodiments.

BRIEF DESCRIPTION OF THE DRAWINGS

The present disclosure is described with reference to the attached drawings, wherein the same reference symbols relate to the same parts and/or to similar parts and/or to corresponding parts of the system. In the drawings.

DETAILED DESCRIPTION

Figure 1:
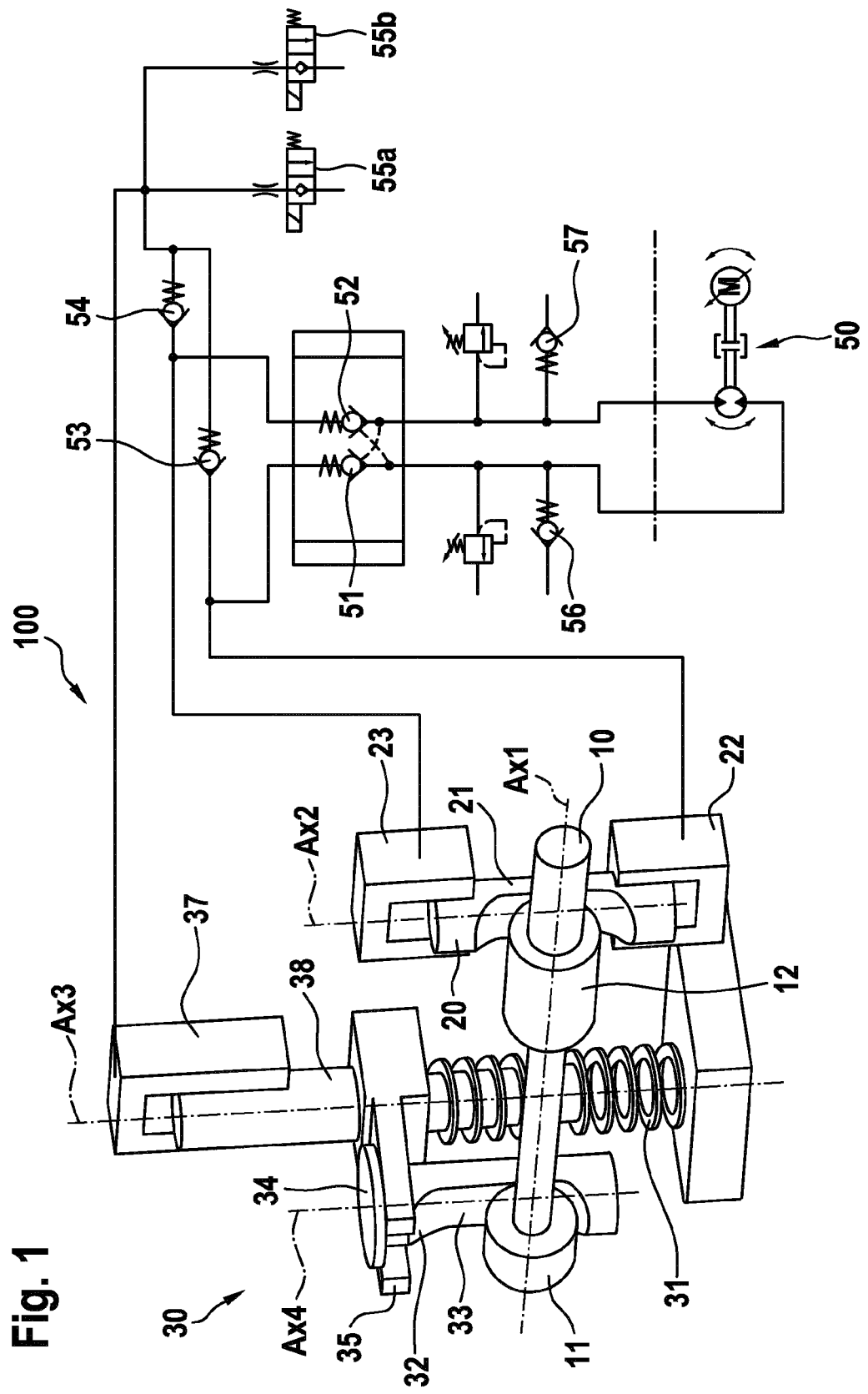
FIG. 1 shows schematically a view of an electrohydraulic system according to an embodiment of the present disclosure.

The present disclosure is described below with reference to specific embodiments as shown in the attached drawings. Nevertheless, the present disclosure is not limited to the particular embodiments which are described in the following detailed description and are shown in the drawings and instead the embodiments described illustrate only some aspects of the present disclosure, the scope of protection of which is defined by the claims.

Further modifications and variations of the present disclosure are clear to a person skilled in the art. The present description thus comprises all modifications and/or variations of the present disclosure, the scope of protection of which is defined by the claims.

The main components of the electrohydraulic system are explained in the following paragraphs with reference to FIG. 1. The mechanical components are described in detail first and then the hydraulic components.

The electrohydraulic system 100 comprises an output shaft 10, wherein the end section of the output shaft 10, which is shown on the right-hand side of FIG. 1, is configured to be connected to a valve so that the rotation of the output shaft 10 can be transmitted to the valve.

Teeth 12, by means of which the output shaft can be revolved, are provided along the axis Ax1 of the output shaft 10 (hereafter simply referred to as "first axis"). Namely, a hydraulic piston 20, which moves along a second axis Ax2, transmits its axial movement to the input shaft via teeth which are arranged along a rod section of the hydraulic piston.

The hydraulic piston is guided in two cylinder housings 22, 23, wherein a first cylinder housing 22 is arranged below the output shaft 10 and a second cylinder housing 23 is arranged above the output shaft 10.

As is described more precisely in the course of the description, a pressure medium is fed into one of the cylinder housings 22, 23 so that the axial position of the piston can be controlled.

A pretensioning mechanism 30, which is configured to obtain a rotated position of the output shaft 10 and secure said position in the event of a fault, is arranged along the first axis.

The pretensioning mechanism 30 comprises an elastic element 31, a first connecting element 32, and a second connecting element 35.

The elastic element 31 is configured to store energy generated by its pretensioning and to transmit said energy to the output shaft 10 in the event of a fault such that a predetermined position of the output shaft 10 is secured. The elastic element 31 extends along a third axis Ax3 which is parallel to the second axis Ax2. The spacing between a plane which is perpendicular to the first axis Ax1 and runs through the second axis Ax2, and a plane which is perpendicular to the first axis Ax1 and runs through the third axis Ax3, measured along a line parallel to the output shaft, is greater than zero, preferably in the range between 15 and 80 mm.

The elastic element 31 can preferably, as shown in FIG. 1, be a spring which is configured to store and transmit energy along the third axis Ax3.

The first connecting element 32 has teeth 33 which are in engagement with teeth 11 of the output shaft 10.

In particular, when the output shaft 10 rotates, the first connecting element 32 moves along a fourth axis Ax4 which is parallel to the third axis Ax3.

In view of the above description, it is clear that the second axis Ax2 and the third axis Ax3 are next to each other in parallel and the first axis Ax1 is perpendicular to the second axis Ax2 and to the third axis Ax3.

One end of the first connecting element 32, which is arranged opposite the input shaft and which is an end section of the first connecting element 32, has a limit stop 34. As will become apparent from the continuation of the description, the purpose of the limit stop is to determine the end position of the output shaft.

Furthermore, the pretensioning mechanism 30 comprises a second connecting element 35 which is fixedly connected to the elastic element 31. The second connecting element 35 is coupled in sliding fashion to the first connecting element 32 and is arranged so as to carry along the first connecting element 32 on the limit stop 34 when the elastic element 31 is relaxed.

As can be seen in FIG. 1, the second connecting element 35 is directly connected to a hydraulic cylinder 37 so that the movement of a piston of the hydraulic cylinder 37 can be transmitted to the elastic element 31. The hydraulic cylinder therefore enables the tensioning and relaxing of the elastic element by means of a hydraulic control system which controls the feeding and removal of a pressure medium to and from the hydraulic cylinder.

Figure 2:
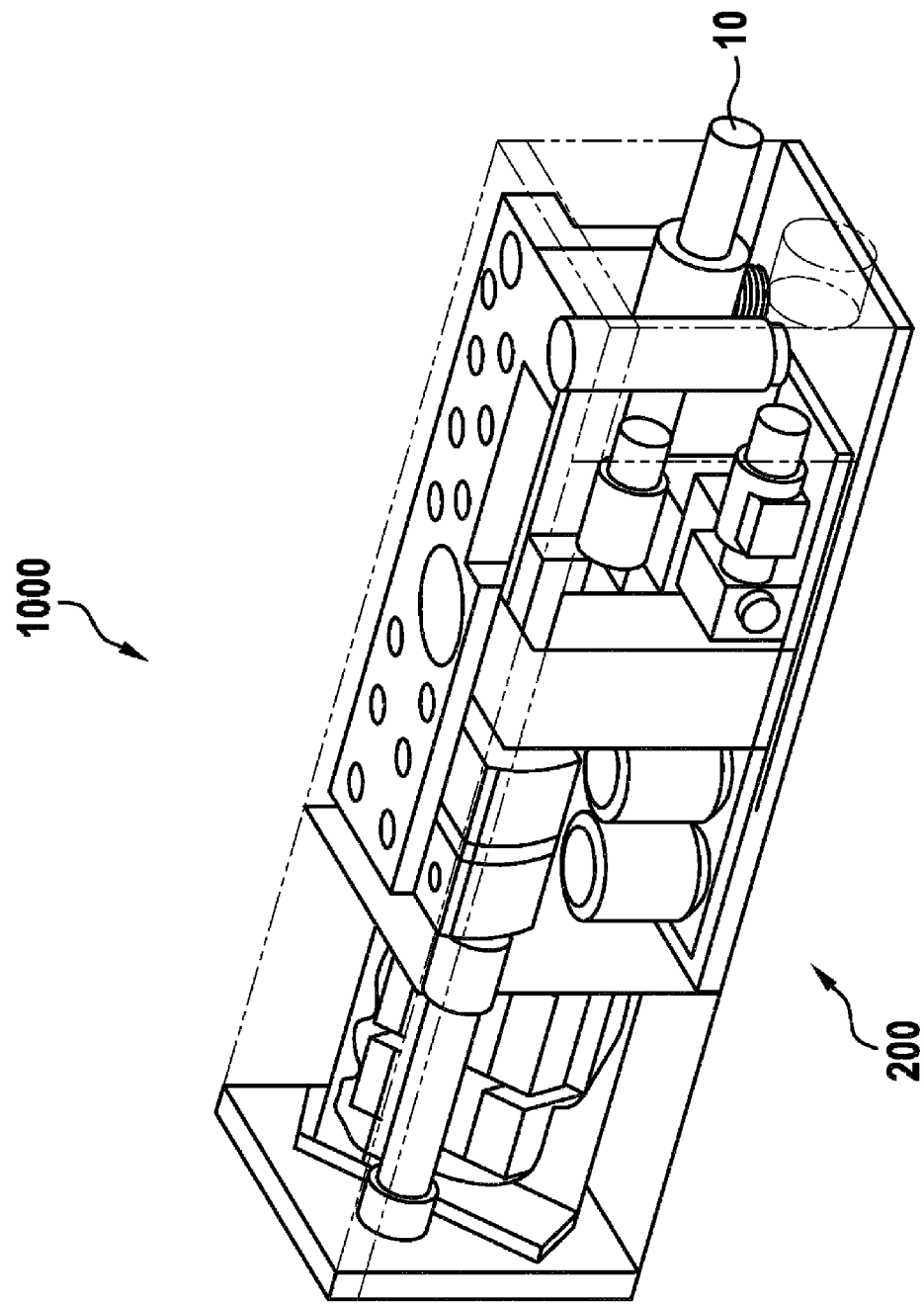
FIG. 2 shows schematically a three-dimensional view of an electrohydraulic arrangement according to an embodiment of the present disclosure.

FIG. 2 shows schematically a three-dimensional view of an electrohydraulic arrangement 1000. The arrangement comprises the above described electrohydraulic system 100 and a housing 200 in which the system 100 is mounted. As can be seen in FIG. 2, the housing 200 has an elongated form which extends along the output shaft 10.

The housing 200 illustrated is cuboid and the axis of the cuboid is arranged parallel to the first axis of the output shaft 10. The form of the housing 200 is not limited to a cuboid. It can otherwise preferably have any form in which a cross-section, perpendicular to the output shaft 10 of the housing 200 and close to an end section of the housing 200, has two pairs of edges, wherein there are two edges, parallel to each other, for each pair of edges.

The end section of the output shaft 10, which is on the right-hand side of FIG. 2, projects from the housing 200 and can be reversibly connected to and disconnected from the valve.

The method which is used to control the electrohydraulic system 100 is now described with reference to FIGS. 3-5.

Figure 3:
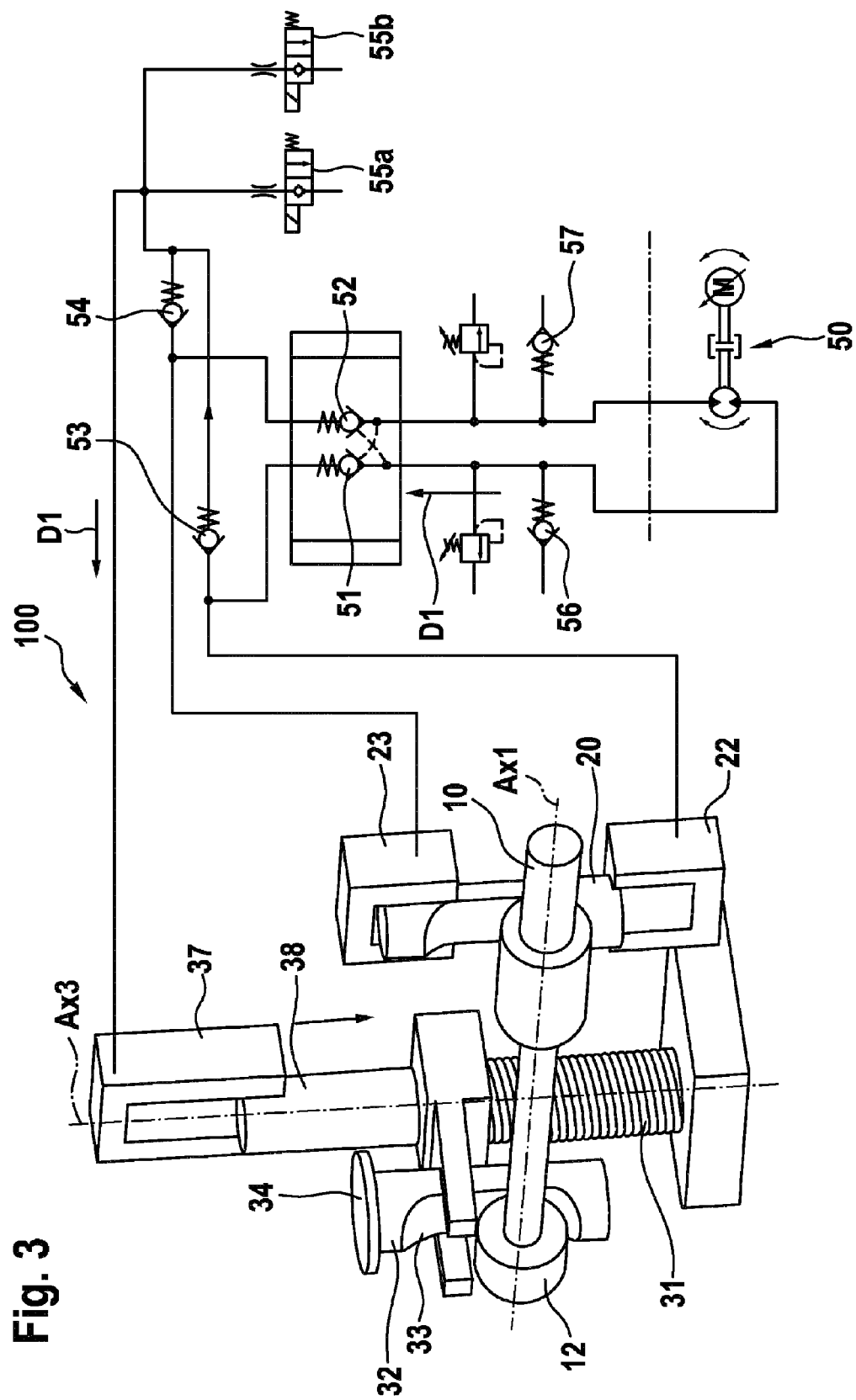
FIG. 3 shows schematically a view of the electrohydraulic system from FIG. 1 when the elastic element is pretensioned.

FIG. 3 shows a step of pretensioning the elastic element 31. In the starting state, the hydraulic piston 20 is situated at the limit stop in the second cylinder housing 23 at an upper end position. In this state, the two valves 55a and 55b are closed. Furthermore, at this starting position, the limit stop 34 of the first connecting element 32 is in engagement with the second connecting element 35.

The pretensioning is effected by pumping a pressure medium (for example, oil) by means of a pump 50 which is preferably driven by an electric motor.

The pressure medium flows through a non-return valve 57 which is connected to an external space (for example, to a tank) and reaches an inlet of the pump 50. The pressure medium is then pumped and flows from the outlet of the pump 50 to a first shut-off valve 51 in the direction which is marked D1.

In particular because the hydraulic piston 20 is situated in an end-of-stroke position, the pressure medium flows to the hydraulic cylinder 37 through the non-return valve 53 and not into the first cylinder housing 22.

When the pressure medium flows into the hydraulic cylinder 37, the piston 38 is pushed downward along the third axis Ax3 by the hydraulic cylinder 37 so that the elastic element 31 is tensioned downward.

Because the piston 38 of the hydraulic cylinder 37 is fixedly connected to the second connecting element 35, the latter is simultaneously pushed downward. As a result, as can be seen in FIG. 3, the end sections of the second connecting element 35 slide over the outer surface of the first connecting element 32. The first connecting element 32 therefore remains fixed in the same position.

After the elastic element 31 has been pretensioned, the valves 53 and 54 decouple the piston 38 from the first and from the second cylinder housing 22, 23. The shut-off direction 53 and 54 of the valves is from the hydraulic cylinder 37 to the first and the second cylinder housing 22, 23.

By virtue of this arrangement, it is possible to rotate the output shaft 10 via the valves 51 and 52 in both directions without influencing the pretensioning device 30.

Figure 4:
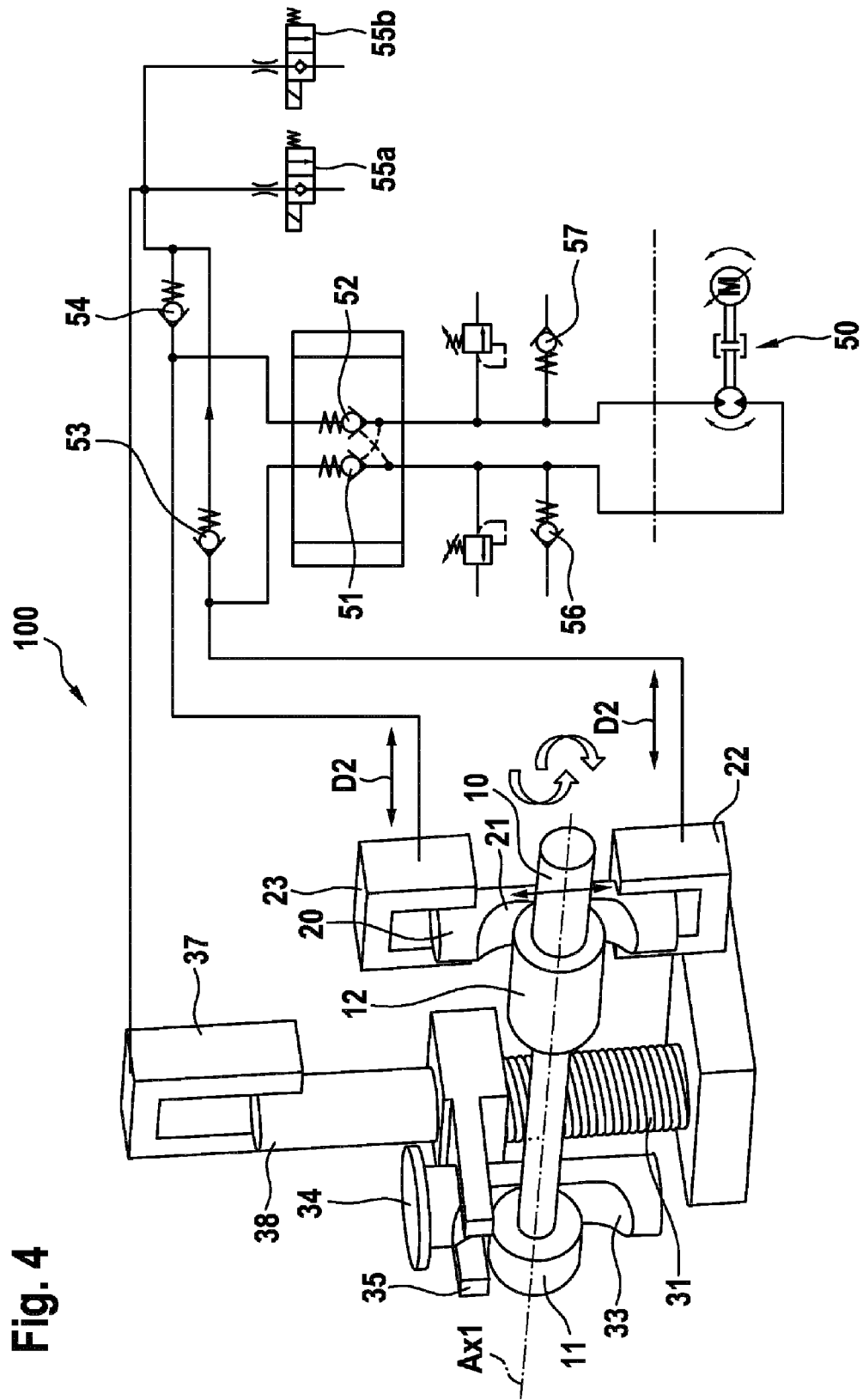
FIG. 4 shows schematically a view of the electrohydraulic system from FIG. 1 in the case of the adjustment function of the output shaft.

In the next step, which is illustrated in FIG. 4, a rotated position of the output shaft 10 is regulated by the pump 50. Positioning is effected by pumping the pressure medium which is fed into one of the two cylinder housings (see direction D2 of the arrows marked).

In the example which is illustrated in FIG. 4, the pressure medium has been fed into the second cylinder housing 23. The piston 20 has thus been pushed downward and the output shaft 10 hence rotated clockwise (viewed from right to left in FIG. 4) by the displacement of the teeth 21 of the piston 20.

By virtue of the rotation of the teeth 11 of the output shaft 10, the above described rotation of the output shaft 10 causes a displacement of the first connecting element 32 downward.

As can be seen in FIG. 4, the output shaft 10 can be rotated both clockwise and counterclockwise by means of the pump 50 which can rotate in both directions so that a valve (not shown in the Figures) which is positioned at an end section of the output shaft 10 can be rotated in both directions.

If leakage occurs in the system which causes a loss of pressure at the pretensioning cylinder 37, depending on the present position of the output shaft set by the drive motor 50, the pretensioning device 37 can be supplied with pressure medium without leaving the current position of the output shaft.

As an alternative to the method which has just been described, the pretensioning mechanism 30 can be pretensioned simultaneously with the rotation of the output shaft 10.

In this case too, the hydraulic piston 20 is situated in the starting state at the limit stop in the second cylinder housing 23 at an upper end position. In this state, the two valves 55a and 55b are closed. Furthermore, at this starting position the limit stop 34 of the first connecting element 32 is in engagement with the second connecting element 35.

The pretensioning is effected by pumping the pressure medium by means of the pump 50. The pressure medium flows from the first cylinder housing 23 and reaches an inlet of the pump 50. The pressure medium is then pumped and flows from the outlet of the pump 50 to a shut-off valve 52. The pressure medium flows to the hydraulic cylinder 37 through the non-return valve 54 and simultaneously into the second cylinder housing 22.

When the pressure medium flows into the hydraulic cylinder 37, the piston 20 is pushed downward along the third axis Ax3 by the hydraulic cylinder 37 so that the elastic element is tensioned downward. When the pressure medium simultaneously flows into the second cylinder housing 22, the output shaft 10 is simultaneously rotated by the piston 20.

In this case, the pretensioning mechanism 30 is therefore pretensioned simultaneously with the rotation of the output shaft 10.

Figure 5:
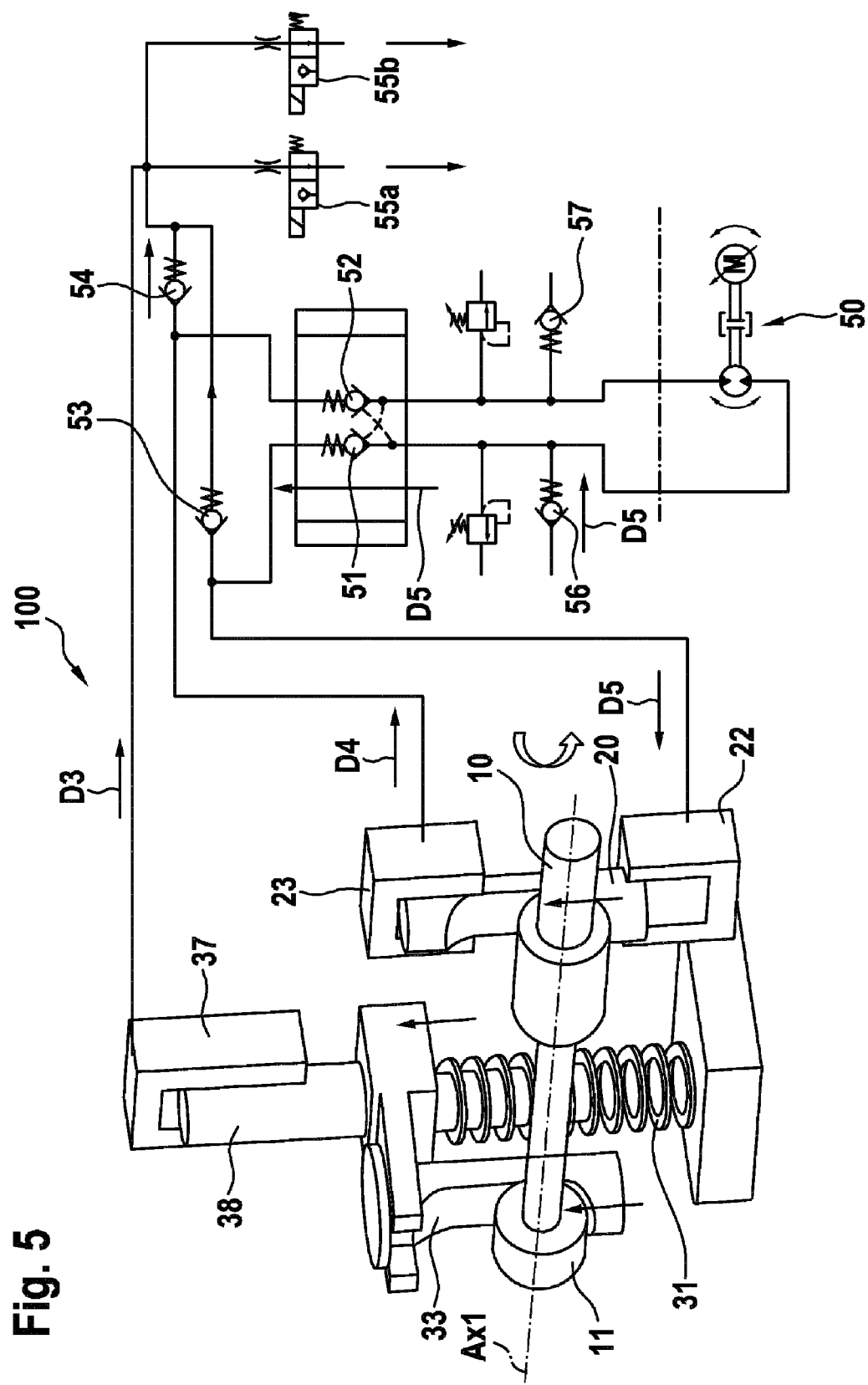
FIG. 5 shows schematically a view of the electrohydraulic system from FIG. 1 in the case of a fault.

In the event of a fault, as can be seen in FIG. 5, the energy which was stored in the elastic element is released by the elastic element being relaxed and is transmitted to the first and second connecting element.

In particular, the second connecting element 35 is pushed upward by the force of the elastic element 31. By virtue of the interaction between the limit stop 34 and the second connecting element 35, the output shaft 10 is rotated into a predetermined position by means of the teeth 11, 33 of the output shaft 10 and the first connecting element.

The predetermined position can be a position at which the piston 20 is at the limit stop in the second cylinder housing 23 and/or a position at which the piston 38 is at the limit stop. Alternatively or additionally, the limit stops can be predetermined by a valve attached to the outside of the output shaft 10.

As a result, the piston is rotated into a predetermined position which coincides with the positions shown in FIGS. 1 and 3 by means of the teeth 11, 21 of the output shaft 10 and the piston 20.

The following paragraphs will describe in detail how the electrohydraulic system can be activated in the event of a fault.

The outlet valves 55a and 55b are first moved into an open position so that the pressure medium which flows from the hydraulic cylinder 37 in the direction D3 can be brought to the outside (for example, to a tank).

At the same time, because the output shaft 10 is rotated and the piston 20 is pushed upward, the pressure medium which is situated in the second cylinder housing 23 is brought to the outside through the non-return valve 54 and the outlet valves 55a and 55b in the direction D4.

As a result, the pressure in the first cylinder housing 22 will fall and the inlet valve 56 will open so that pressure medium can reach the first cylinder housing 22 from the outside (for example, from a tank) in the direction marked D5.

In this state, a rotated position of the output shaft 10 is thus secured.

Whilst the present disclosure has been described with reference to the above-described embodiments, it is clear to a person skilled in the art that it is possible to implement different modifications, variations, and improvements of the present disclosure in the light of the above-described teaching and within the scope of the attached claims without going beyond the scope of protection of the disclosure.

For example, even though the elastic element comprises only one elastic spring in the drawings, the elastic element can comprise an arrangement of multiple springs arranged in parallel. It is, however, important that the springs are arranged in parallel to the third axis. It goes without saying that the elastic element can be a hydraulic accumulator which is configured to store and to transmit energy along the third axis Ax3.

Furthermore, the initial status of the piston 20 can be the converse of the position which is characterized in FIGS. 1 and 3.

Furthermore, the areas in which people skilled in the art should be knowledgeable have not been described here in order not to obscure the described disclosure unnecessarily.

Accordingly, the disclosure is not to be limited by the specific embodiments illustrated but only by the scope of protection of the attached claims.

LIST OF REFERENCE SYMBOLS 10 output shaft
11 teeth of the output shaft
12 teeth of the output shaft
20 hydraulic piston
21 rod section
22 first cylinder housing
23 second cylinder housing
30 pretensioning mechanism
31 elastic element
32 first connecting element
33 teeth of the first connecting element 34 limit stop
35 second connecting element
37 hydraulic cylinder
38 piston of the hydraulic cylinder
50 pump
51, 52, 43, 54, 55a, 55b, 56, 57 valves
Ax1 first axis
Ax2 second axis
Ax3 third axis
Ax4 fourth axis
100 electrohydraulic system
200 housing
1000 electrohydraulic arrangement

The invention claimed is:

1. An electrohydraulic system for a valve, which is configured to drive a valve in rotation, wherein the system comprises the following:
an output shaft configured to connect directly to the valve to rotationally drive the valve, the output shaft extending along a first axis;
a hydraulic piston configured to be activated by a pressure medium and to rotate the output shaft, the hydraulic piston extending along a second axis which is perpendicular to the first axis, the hydraulic piston being guided into a first cylinder housing and a second cylinder housing;
a pretensioning mechanism comprising an elastic element extending along a third axis and at least one hydraulic cylinder that is connected to at least one of the first and second cylinder housings, the pretensioning mechanism configured to store energy generated by pretensioning the elastic element and to transmit said energy to the output shaft in the event of a fault to secure a predetermined position of the output shaft, the pretensioning mechanism being pretensioned by the at least one hydraulic cylinder; and
a first shut-off valve configured to decouple the pretensioning mechanism from the hydraulic piston, the first shut-off valve arranged between one of the first and second cylinder housings and the hydraulic cylinder and having a first shut-off direction from the hydraulic cylinder toward the one of the first and second cylinder housings.

2. The system as claimed in claim 1, wherein the predetermined position of the output shaft is a position in which the hydraulic piston is situated at a limit stop of the first cylinder housing or the second cylinder housing.

3. The system as claimed in claim 1, wherein the first cylinder housing is connected to the hydraulic cylinder by the first shut-off valve, and the system further comprises:
a second shut-off valve arranged between the second cylinder housing and the hydraulic cylinder and having a second shut-off direction is from the hydraulic cylinder toward the second cylinder housing.

4. The system as claimed in claim 1, wherein the first shut-off valve is a non-return valve, and the system further comprises:
a pump connected to a valve seat side of the non-return valve.

5. The system as claimed in claim 1, the pretensioning mechanism further comprising a connecting mechanism coupled to the output shaft, the connecting mechanism comprising:
a first connecting element engaged with teeth of the output shaft and configured such that, when the output shaft rotates, the first connecting element moves along a fourth axis which is parallel to the third axis, the first connecting element having a limit stop at an end opposite the output shaft; and
a second connecting element fixedly connected to the elastic element and coupled in sliding fashion to the first connecting element, the second connecting element arranged so as to carry along the first connecting element on the limit stop when the elastic element is relaxed.

6. The system as claimed in claim 1, wherein:
a first one of the first and second cylinder housings is arranged above the output shaft and a second one of the first and second cylinder housings is arranged below the output shaft,
the hydraulic piston comprises a rod section between the first and second cylinder housings, the rod section having first teeth which are in engagement with second teeth of the output shaft, and
the hydraulic piston is activated by the pressure medium being fed to at least one of the first and second cylinder housings.

7. The system as claimed in claim 1, wherein the elastic element comprises at least one spring system with at least one spring the at least one spring arranged parallel to the third axis.

8. The system as claimed in claim 7, wherein the at least one spring includes an arrangement of multiple springs arranged in parallel.

9. The system as claimed in claim 1, wherein the third axis is arranged perpendicular to the first axis.

10. The system as claimed in claim 1, wherein the second axis and the third axis are next to each other in parallel and the first axis is perpendicular to the second axis and to the third axis.

11. An electrohydraulic arrangement comprising:
an electrohydraulic system comprising:
an output shaft configured to connect directly to a valve to rotationally drive the valve, the output shaft extending along a first axis;
a hydraulic piston configured to be activated by a pressure medium and to rotate the output shaft, the hydraulic piston extending along a second axis which is perpendicular to the first axis, the hydraulic piston being guided into a first cylinder housing and a second cylinder housing;
a pretensioning mechanism comprising an elastic element extending along a third axis and at least one hydraulic cylinder that is connected to at least one of the first and second cylinder housings, the pretensioning mechanism configured to store energy generated by pretensioning the elastic element and to transmit said energy to the output shaft in the event of a fault to secure a predetermined position of the output shaft, the pretensioning mechanism being pretensioned by the at least one hydraulic cylinder; and
a first shut-off valve configured to decouple the pretensioning mechanism from the hydraulic piston, the first shut-off valve arranged between one of the first and second cylinder housings and the hydraulic cylinder and having a first shut-off direction from the hydraulic cylinder toward the one of the first and second cylinder housings; and
a housing in which the electrohydraulic system is mounted, the housing having an elongated form extending along the output shaft,
wherein a cross-section, taken perpendicular to the output shaft of the housing and close to an end section of the housing, has two pairs of edges, each pair of edges including two edges that are parallel to each other.

12. The arrangement as claimed in claim 11, wherein the cross-section is polygonal.

13. The arrangement as claimed in claim 11, wherein an end section of the output shaft opposite to the pretensioning mechanism projects from the housing, and the end section of the output shaft is configured to be reversibly connected to and disconnected from the valve.

14. The arrangement as claimed in claim 11, wherein the cross-section is square.

* * * * *